(12) United States Patent
May et al.

(10) Patent No.: US 6,255,622 B1
(45) Date of Patent: Jul. 3, 2001

(54) ELECTRONIC DEVICE HAVING EXTERNAL SURFACE THERMAL FEEDBACK

(75) Inventors: Gregory J May, Corvallis; John R Sterner, Albany, both of OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/429,498

(22) Filed: Oct. 27, 1999

(51) Int. Cl.[7] .................................................. H05B 1/00
(52) U.S. Cl. .......................... 219/209; 219/201; 219/494; 361/687
(58) Field of Search .......................... 219/482, 490–494, 219/497, 200, 201, 209; 361/687

(56) References Cited

U.S. PATENT DOCUMENTS

| | | | |
|---|---|---|---|
| 4,797,840 | 1/1989 | Fraden | 364/557 |
| 5,422,832 * | 6/1995 | Moyal | 364/557 |
| 5,430,609 * | 7/1995 | Kikinis | 361/687 |
| 5,672,289 * | 9/1997 | O'Neill | 219/497 |
| 5,798,502 * | 8/1998 | Comer | 219/497 |
| 5,828,034 * | 10/1998 | Chang | 219/209 |
| 5,844,208 * | 12/1998 | Tustaniwskyj et al. | 219/494 |
| 6,084,769 * | 7/2000 | Moore et al. | 361/687 |
| 6,118,654 * | 9/2000 | Bhatia | 361/687 |
| 6,127,663 * | 10/2000 | Jones | 219/553 |
| 6,157,538 * | 12/2000 | Ali et al. | 361/704 |

* cited by examiner

*Primary Examiner*—Tu Ba Hoang
(74) *Attorney, Agent, or Firm*—Timothy F. Myers

(57) ABSTRACT

An electronic device has a case enclosing at least one heat producing component. The at least one heat producing component is capable of transmitting heat energy outside of the case. The electronic device further has a thermal sensor connected to control logic that is capable of sensing the heat energy outside of the case. The control logic is coupled to the at least one heat producing component such that it is capable of regulating the heat energy from the at least one heat producing component in response to the sensed heat energy from the thermal sensor.

36 Claims, 8 Drawing Sheets

ELECTRONIC DEVICE HAVING EXTERNAL SURFACE THERMAL FEEDBACK

FIELD OF THE INVENTION

This invention relates to thermal control in electronic devices. More particularly, it relates to using thermal sensors to detect surface temperature external to the electronic devices.

BACKGROUND OF THE INVENTION

Many battery operated electronic devices are known for their portability and low powered operation. However, several electronic devices such as notebook computers, radio communication devices, and power tools, to name a few, have progressed to a comparable level of performance as their non-portable counterparts. This increase in performance has led to higher power consumption by these devices. The higher power consumption is partially expended as excess heat. Since users handle these electronic devices, their external surface temperatures can become uncomfortable or even unsafe. When near maximum power is expended by the electronic device, potentially severe burns may result. Manufacturers, however, generally only regulate the temperatures internal to these high-powered electronic devices to prevent internal component damage. Often the external case temperature is ignored. It is up to the user of these devices to decide whether to use an electronic device if it gets too hot. When the user determines that the electronic device is too hot, the user turns the computer off and thus the electronic device can only provide intermittent use.

In the case of notebook computers, in particular, intermittent use is not tolerable so manufacturers have begun to further limit the internal temperatures to prevent the external surface temperatures from getting too hot for the user to operate. Often times, this limit on internal temperatures causes the notebook computer to operate at a lower speed, thus delivering less performance. Since the regulation of the internal temperature is then always performed, the notebook computer may not be operating at it theoretical peak performance.

Besides the potential to burn users, several other serious problems can occur due to hot surface temperatures. One anecdotal story tells of an airline passenger who had difficulty returning his tray to its 'full, upright position'. His notebook computer had melted the tray and it fused to the plastic case of the notebook. In another instance, a user had operated his notebook computer on a countertop and after removing the notebook, found that the countertop had become discolored (burned) due to the heat from the notebook. Further, when notebook computers are operated on a user's lap, discomfort has been reported due to the excessive heat. Accordingly, manufacturers are becoming concerned about the case surface temperatures and are limiting the computer's performance to keep the surface temperatures from becoming too hot. However, in several environments, such as when docked, notebook computers can be operated at higher speeds and thus higher external case surface temperatures without causing harm. Therefore, a need exists for electronic devices to be more intelligent in managing thermal heat dissipated out of the device.

SUMMARY

An electronic device has a case enclosing at least one heat producing component. The at least one heat producing component is capable of transmitting heat energy outside of the case. The electronic device further has a thermal sensor connected to control logic that is capable of sensing the heat energy outside of the case. The control logic is coupled to the at least one heat producing component such that it is capable of regulating the heat energy from the at least one heat producing component in response to the sensed heat energy from the thermal sensor.

DETAILED DESCRIPTION OF THE PREFERRED AND ALTERNATE EMBODIMENTS

The invention provides further intelligence in the thermal management of electronic devices. In addition to any thermal management used to protect internal components from excessive heat, the invention protects surfaces external from the electronic device from becoming too hot. This external thermal control is provided by allowing for thermal feedback of an external surface temperature to a thermal control system within the electronic device. Rather than reading the external case temperature of the electronic device, a thermal sensor actually detects, directly or indirectly, the temperature of a surface that is external to the case of the electronic device. The thermal sensor thus determines the remote temperature of an external surface and not the external case temperature of the electronic device. This technique allows the external case temperature of the electronic device to have a higher case temperature than conventional designs based upon on the external surface the electronic device is placed.

Based on the reading returned from the thermal sensor, the thermal control logic within the electronic device adjusts the amount of heat generated by heat producing components, such as microprocessors, memory circuits, graphic controllers, and power supplies to name a few. By regulating the amount of heat produced by an electronic device based on how an external surface is accepting the heat, the electronic device can take advantage (for example, run faster) of situations that cannot be done with conventional electronic devices. Other advantages will become apparent in further descriptions of several embodiments of the invention.

Figure 1:
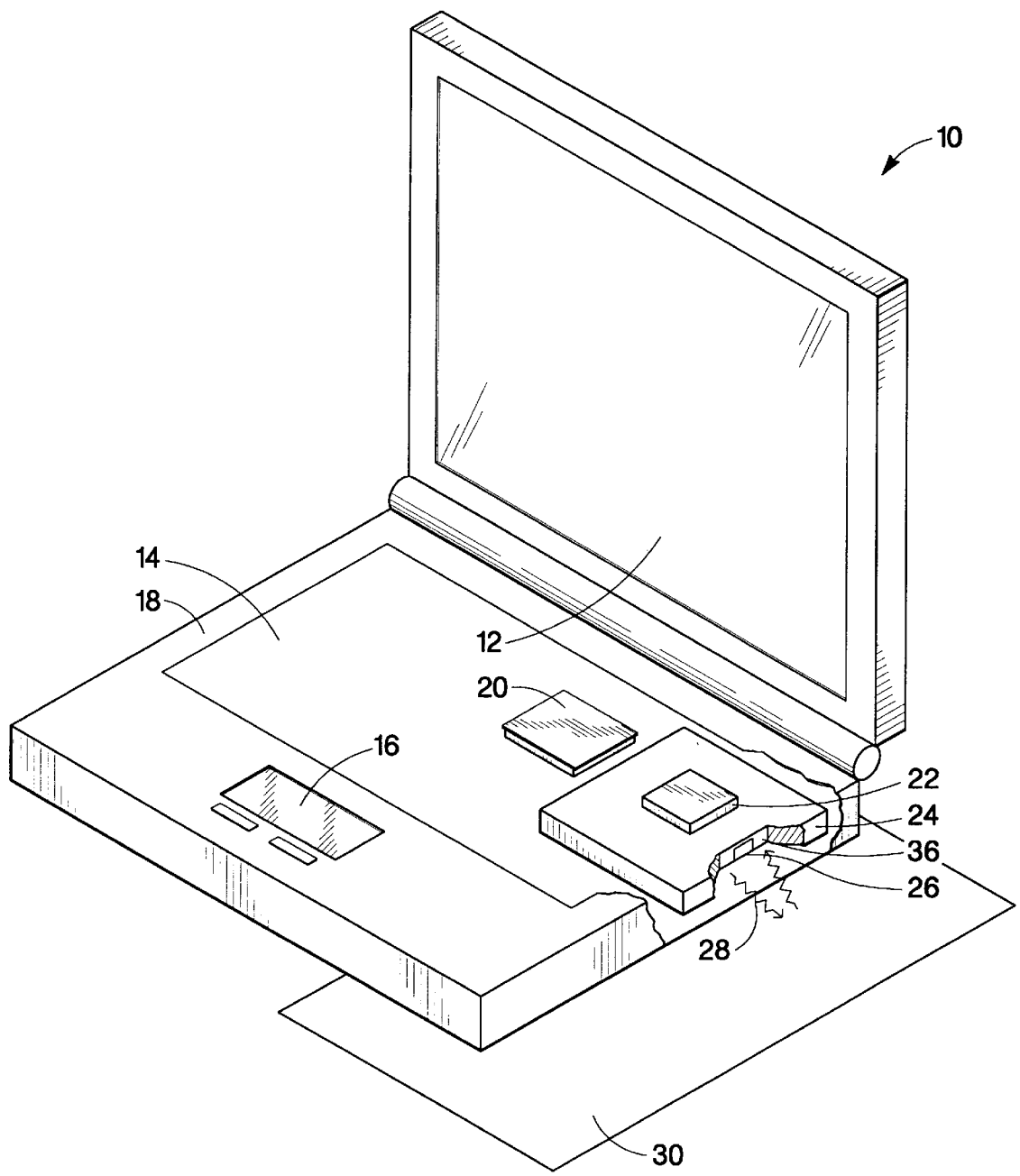
FIG. 1 is an perspective illustration of an electronic device with a cut-away view showing a heat producing component emitting heat energy that is reflected off an exterior surface.

FIG. 1 is a perspective drawing of an electronic device, depicted here as a notebook computer 10. Other electronic devices such as personal data assistants, radios, televisions, CD players, cellphones, and power tools, to name a few, are also able to incorporate and take advantage of the features of the invention.

The notebook computer 10 has a case 18 containing input devices and output devices. The input devices shown are a keyboard 14 and a touchpad 16. One output device shown is a display 12. Within the case 18, the notebook computer contains several circuits for allowing the input devices to enter data that is processed and viewed on display 12. During this processing the circuits consume energy. Within the circuits are at least one heat producing component 22, typically a central processing unit (CPU), a memory circuit, a graphics device, or battery charge circuit or combination thereof that dissipates some of the consumed energy as heat. Other heat producing components exist for electronic devices other than notebook computers such as motors, solenoids, heating coils, etc. Often times, these heat producing components or a portion of them are attached to a heat dissipation structure 24, such as a heat sink, a heat pipe, a heat spreader, or a fan, to name a few. Whether connected to the heat dissipation structure 24 or not, the heat producing components 22 couple heat energy 28 outside of the case 18 of the notebook computer 10. This heat energy 28 affects an external surface 30 and increases its surface temperature. The external surface 30 may be a user's lap, a user's leg, a countertop, an airline tray, or a docking station tray, to name a few.

The increased intelligent thermal control for the notebook computer 10 uses a thermal sensor 26 to detect the surface temperature of exterior surface 30. The thermal sensor 26 is connected to control logic 20 which is capable of regulating the heat produced by the at least one heat producing component 22. The thermal sensor 26 is preferably thermally isolated from the heat dissipation structure 24 by thermal isolator 36 to prevent heat radiation from the heat dissipation structure 24 to directly influence the reading from thermal sensor 26 without the heat energy 28 first reflecting or conducting back from an external surface 30. Preferably, the thermal isolator 36 is surrounded by the heat dissipation structure 24 to effectively allow heat energy 28 from the heat dissipation structure 24 to be detected efficiently. Alternatively, the thermal isolation is accomplished by physically locating the thermal sensor 26 sufficiently away from the heat dissipation structure 24 particularly if the thermal sensor is capable of detecting heat remotely, such as with a pyro-electric sensor (see U.S. Pat. No. 4,797,840).

Figure 2:
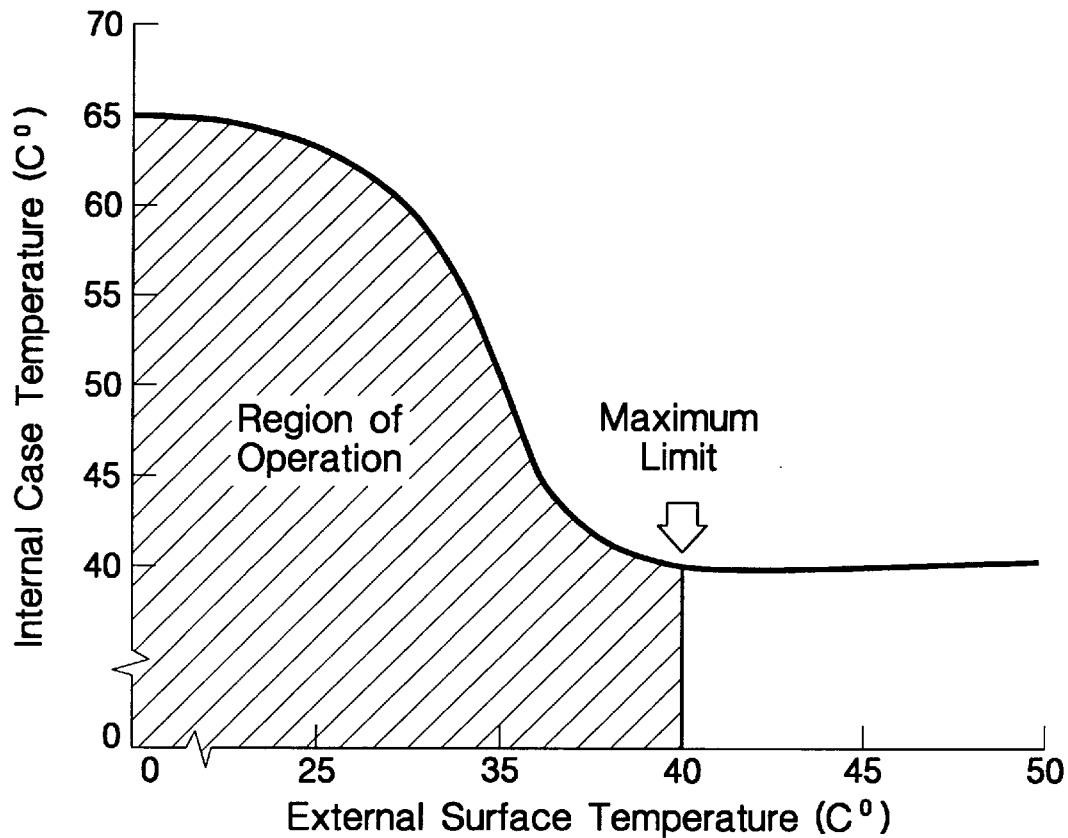
FIG. 2 is a chart illustrating the region of operation for an exemplary embodiment of the invention.

FIG. 2 is a graph illustrating an exemplary operating region which control logic 20 maintains thermal operation of the internal case temperature of the notebook computer 10. The amount of power expended by the heat producing components over time is represented on the vertical axis by measuring the internal case temperature, preferably on the heat dissipation structure 24. The horizontal axis represents the measured external surface temperature sensed by thermal sensor 26. As illustrated on the chart, when the external surface temperature is low, the internal case temperature is allowed to rise. As the external surface temperature rises, the maximum allowable internal case temperature decreases. Once the maximum external surface temperature is reached, the internal case temperature is preferably not allowed to exceed this temperature limit to ensure that the external surface temperature maximum threshold is not breached due to the notebook computer 10. The actual limits chosen for a particular electronic device will depend on the type of device and its expected use with external surfaces. It also has been envisioned that users of electronic devices, such as notebook computers, be allowed to use configuration screens to preset limits based on their preferences (see FIG. 6). Additionally, the manufacturer of the device may enforce a predetermined safety limit.

Figure 3:
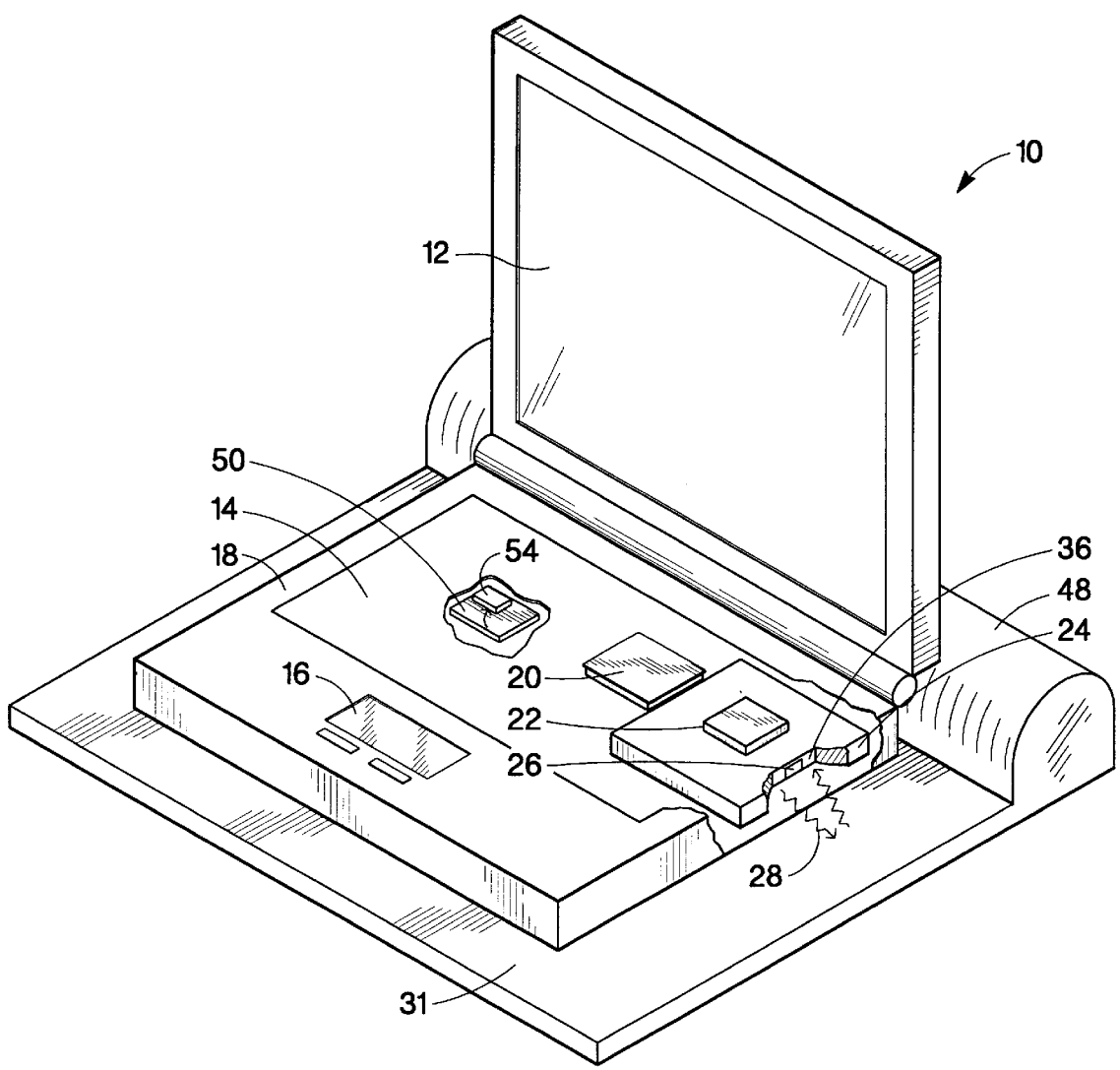
FIG. 3 is an isometric illustration of an electronic device, a notebook computer used in a docking system that has a tray that contains an area with a known surface temperature used for calibrating the thermal sensor.

FIG. 3 is an perspective illustration of the notebook computer of FIG. 1 used in a computer system with a docking station 48 that has a docking tray 31 which contains an area with a known surface 50 having a temperature used for calibrating the thermal sensor 26. The known surface 50 is thermally isolated from the external surface that is to be thermally sensed. An additional thermal sensor 54 is used in this embodiment to detect the temperature of known surface 50. The external surface sensed is preferably the docking tray 31 that is connected to the docking station 48. Further, the additional thermal sensor 54 is optionally envisioned being incorporated into the docking station 48, preferably the docking tray 31, and the signal from the additional thermal sensor 54 routed through the conventional docking connector back to the control logic 20 on the notebook computer.

Figure 4A:
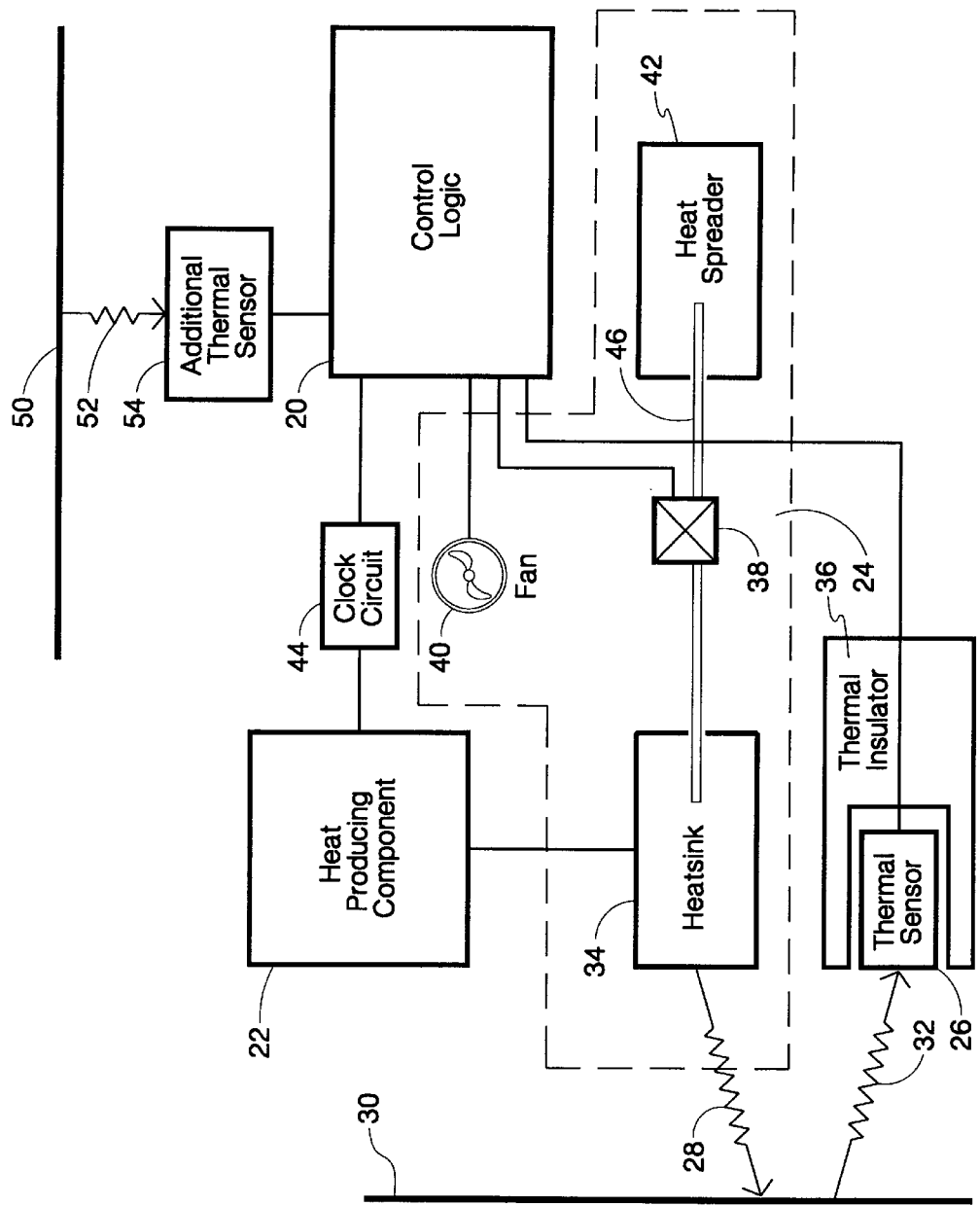
FIG. 4A is an exemplary block diagram of the embodiment of FIG. 3 using two thermal sensors.

FIG. 4A is an exemplary block diagram of a first embodiment of the invention. Heat producing component 22 is thermally coupled to a heat dissipation structure 24 optionally comprising several elements such as a heat sink 34 preferably coupled to a heat pipe 46 having an optional heat pipe valve 38. The heat pipe 46 is further coupled to a heat spreader 42. The heat spreader 42 and heat sink 34 are both thermally coupled and cooled using a fan 40. A thermal sensor 26 is thermally isolated from heat dissipation structure 24 using thermal isolator 36. The output of thermal sensor 26 is connected to control logic 20 to provide feedback of the surface temperature of exterior surface 30. The temperature of exterior surface 30 is affected by heat energy 28 that is radiated from heat sink 34. The temperature of the exterior surface 30 is sensed by thermal sensor 26 by detecting re-radiated heat energy 32.

The control logic 20, in this exemplary embodiment, is able to reduce the heat generated by heat producing component 22 by preferably changing the clock speed or duty cycle in clock circuit 44. For the exemplary embodiment, clock circuit 44 and control logic 20 are incorporated into conventional thermal control logic used in conventional notebook computers. The thermal sensor 26 is fabricated using either thermal diodes, thermocouples, thermistors, or pyro-electric devices, but preferably a thermal diode. The thermal isolator 36 can be fabricated using thermally conductive insulation such as a plastic rigid foam, polypropylene felt, cork, or polycarbonate Acrylonitrile Butadiene Styrene (pc-ABS).

The control logic 20 is further capable of reducing the amount of heat energy 28 radiated from the notebook computer by controlling either the speed of fan 40 or the heat pipe valve 38 or both. By controlling the fan speed, the heat dissipated from heat sink 34 may be moved to another surface, such as a remote side of the notebook, and expelled out of the notebook. By controlling heat pipe valve 38, heat can be transferred from the heat sink 34 to heat spreader 42 which is preferably placed under the keyboard 14 (see FIG. 1).

Also shown in FIG. 4A is an optional additional thermal sensor 54 connected to control logic 20. This additional thermal sensor 54 is located within the notebook computer or optionally in a docking station and coupled to control logic 20 through a docking connector. This additional thermal sensor 54 is used by the control logic 20 to calibrate the thermal sensor 26. Calibration is preferable when the thermal sensor 26 chosen for a given application is better at measuring relative temperature changes than reading absolute temperature values. Calibration may also be preferable if the output of thermal sensor 26 is non-linear. Another purpose for calibration is to allow a notebook computer's thermal system to work with several different vendors of thermal sensors or different types of thermal sensors depending on the cost of the configured notebook.

Control logic 20 calibrates thermal sensor 26 by reading the output of additional thermal sensor 54 which is used to detect known surface sensed heat 52, and thus the temperature of known surface 50. This known surface 50 may be internal to the case 18 of the notebook 10 or it may be a known surface external to the case 18, such as a docking tray 31 platform (see FIG. 3). Preferably, additional thermal sensor 54 and thermal sensor 26 are of the same type of thermal sensor and matched to have similar properties. However, for some thermal sensors, it is not economically feasible to match different sensors.

Figure 4B:
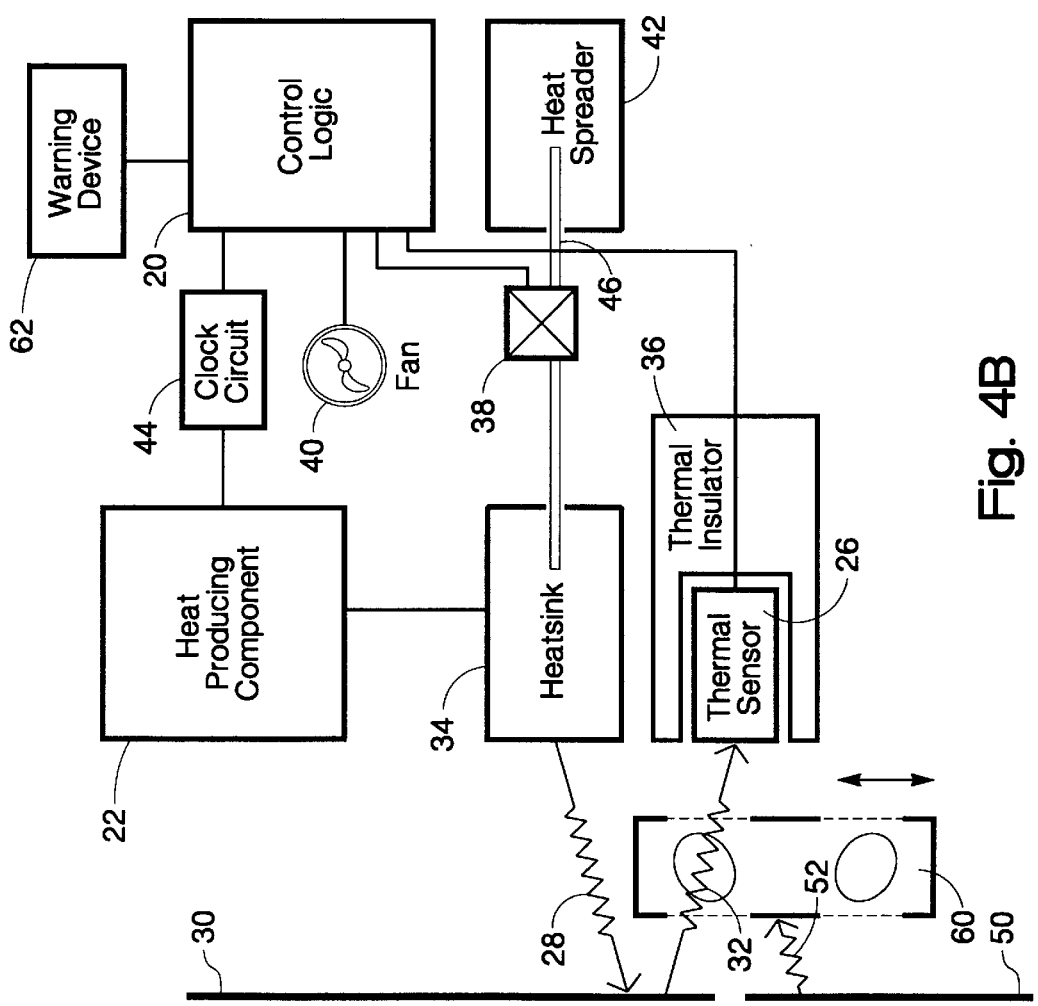
FIG. 4B is an exemplary block diagram of a second embodiment of the invention using a single thermal sensor and a movable lens in a first position.

FIG. 4B is a block diagram of a first alternative embodiment for notebook 10 that uses a single thermal sensor 26 that can still be calibrated. A movable lens 60 performs the calibration. The movable lens 60 may be moved manually by the user or automatically by the control logic 20 such as by using a solenoid (not shown) attached to the moveable lens 60. A docking station can also activate the movable lens 60 when the notebook 10 is inserted within it. The moveable lens 60 has at least two positions. In the first position, external surface 30 absorb heat energy 28 from heat sink 34. Re-radiated heat energy 32 from the external surface 30 is directed to thermal sensor 26 using movable lens 60. In this first position for movable lens 60, known surface heat energy 52 from known surface 50 is blocked from reaching the thermal sensor 26.

Figure 4C:
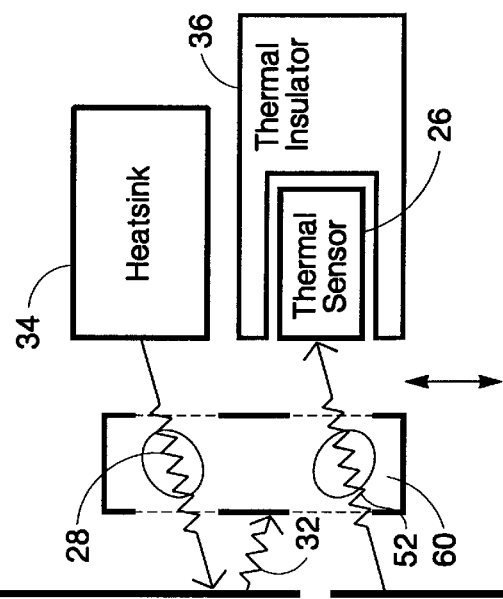
FIG. 4C is an exemplary portion of the block diagram of FIG. 4B in which the movable lens is in a second position.

FIG. 4C is a partial block diagram of the first alternative embodiment shown in FIG. 4B with the movable lens 60 shown in a second position. In the second position, movable lens 60 blocks the re-radiated heat energy 32 from reaching the thermal sensor 26. The movable lens 60, in the second position, allows known surface heat energy 52 to be directed to thermal sensor 26.

Figure 5:
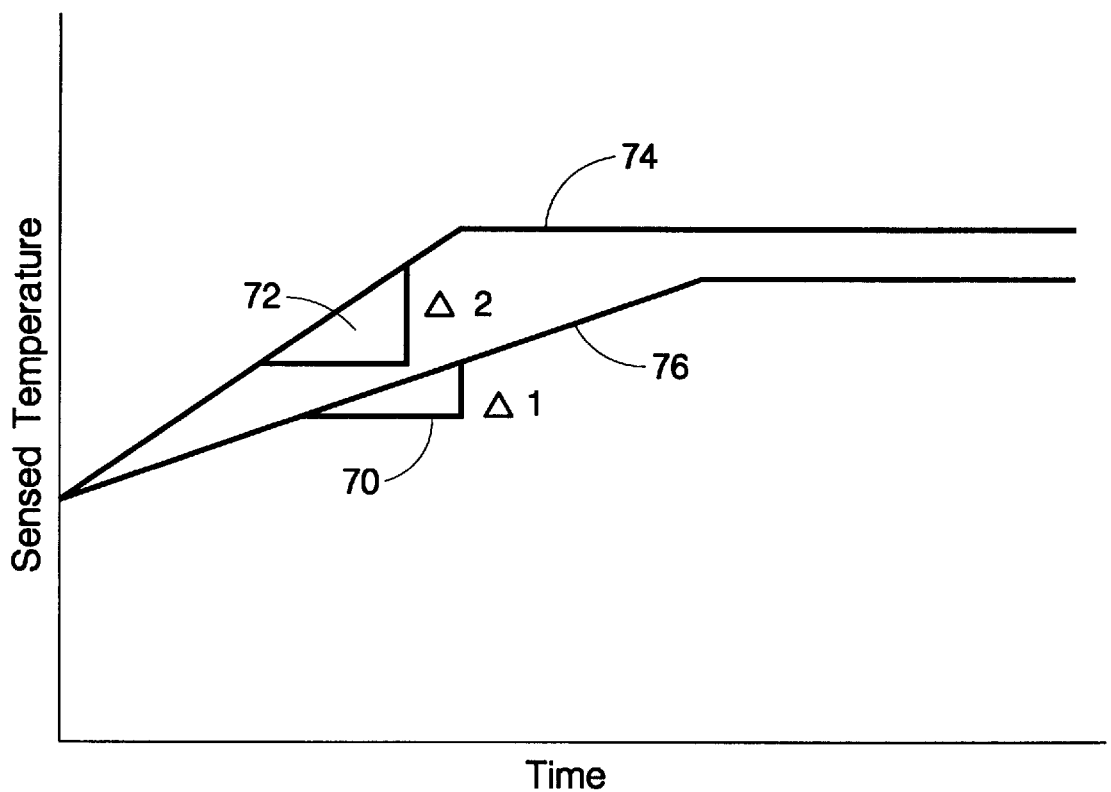
FIG. 5 is an exemplary chart illustrating the rate of change of the surface temperatures for two different surfaces over time.

Another form of thermal feedback does not require an absolute temperature measurement from the thermal sensor 26. FIG. 5 is a chart illustrating sensed temperature over time for a first and second surface where the first surface is a typically encountered surface such as a docking tray for a notebook computer (see FIG. 3). The origin on the time axis represents the notebook 10 in a stable operating state. As the notebook 10 increases its power, due to increased use or computational processing, the heat energy radiated from the notebook 10 causes external surface temperatures to rise. For the first surface 76, a docking tray surface, the temperature rise increases at a first rate of change 70 and eventually stabilizes at an increased temperature. When the notebook 10 is on a second surface (for example, a lap) that cannot dissipate the heat energy as well as the docking tray surface, the second surface has a second rate on change 72 which is larger than the first rate of change 70 before eventually stabilizing at a higher temperature. By detecting the rate of change of temperature rise, the control logic begins to adjust the thermal output of the heat producing components earlier than done by just detecting absolute temperature levels of the first and second surfaces.

This quick response feature is preferable in an electronic device that has a large thermal mass. The large thermal mass prevents the control logic 20 from being able to quickly reduce the amount of heat energy 28 emitted from the case 18. One example is a notebook computer with a large thermal heat sink. When the notebook computer is used normally on a docked surface, the heat sink is allowed to operate at a high temperature. If the user removes the notebook from the dock and tries to place the notebook on his lap, the notebook may be too hot for the user to operate comfortably on his lap. By detecting that rate of change in temperature rise of the external surface, the control logic 20 is able to detect this changed condition earlier than waiting for the temperature on the external surface to stabilize. Thus the regulation begins earlier and the option exists to warn the user before an uncomfortable operation occurs.

Referring back to FIG. 4B, an optional warning device 62 can be incorporated in any embodiment of the invention. The warning device 62 has at least two states. In the first state, the user is alerted that operation of the notebook is OK. In the second state, the user is warned that the use of the notebook might damage an external surface, such as the user's lap. This second state warning is done either because a predetermined heat energy (temperature) level has been exceeded or the rate of change of detected heat energy is changing faster than a predetermined rate. The warning device can assume several forms of alerting such as a light, buzzer, audio alarm or sound, blinking screen, icon, or a mechanical vibration.

Figure 6:
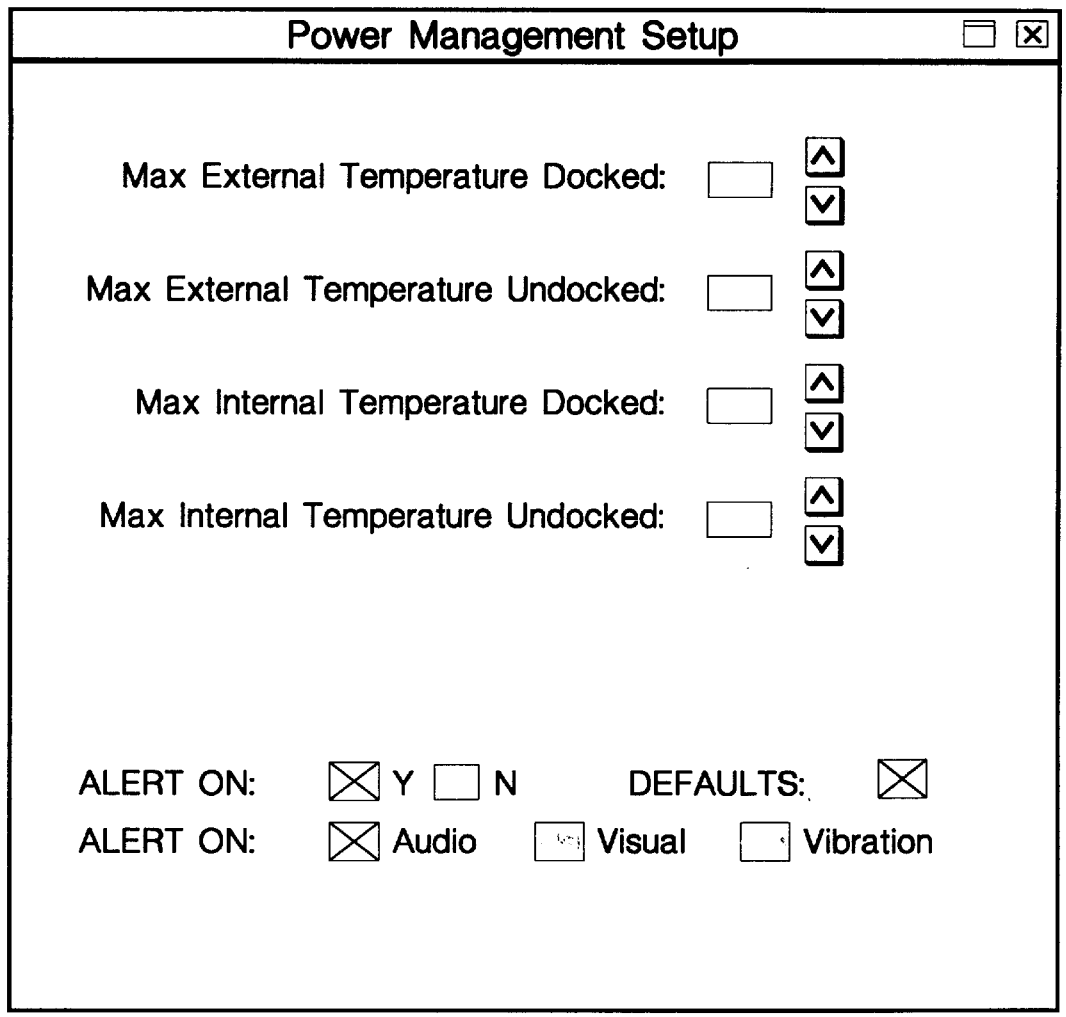
FIG. 6 is an exemplary computer screen used by a user to configure temperature settings.

FIG. 6 is an exemplary illustration of a computer set-up screen that a user of the electronic device can use to configure the internal or external temperature thresholds used by control logic 20. In addition, the user can select if a warning alert, such as sound, visual, or vibratory, is to be performed when the temperature thresholds are exceeded.

Figure 7:
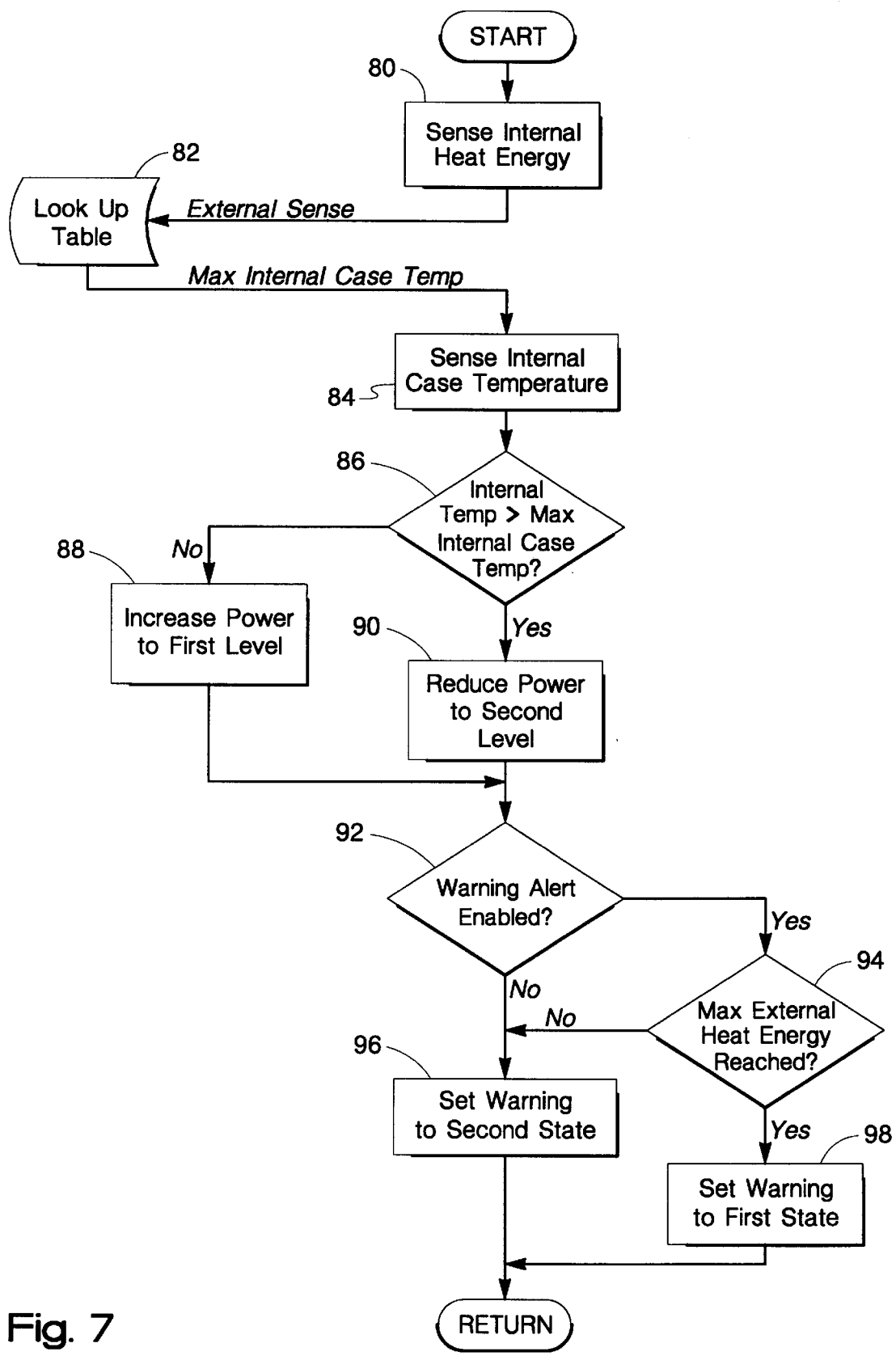
FIG. 7 is an exemplary flow chart of one embodiment of the invention for implementing the region of operation of FIG. 2.

FIG. 7 is an exemplary flow chart of one embodiment for implementing the region of operation of FIG. 2. In Block 80, the heat energy external to the notebook computer is sensed. The sensed reading may be an absolute temperature reading or a rate of change reading. When implementing the rate of change reading, at least two temperature samples are read from the thermal sensor 26 and the difference taken to get a result. With either the absolute temperature reading or the rate of change reading, a calibration step may be taken by reading the temperature from a known surface temperature area. The result returned from the sensed external heat energy block 80 is used as an index to a look up table to retrieve a maximum internal case temperature value in block 82. In block 84, the internal case temperature is sensed using the conventional thermal management control of the notebook computer. In block 86, a decision is made to determine if the sensed internal case temperature is greater than the looked-up maximum internal case temperature based on the external heat energy reading. If not, then in block 88 the power to the heat producing component is increased to a first level. Otherwise, in block 90 the power to the heat producing component is reduced to a second level. In this manner, the heat produced by the heat producing component is regulated in response to the sensed external heat energy. Preferably, but optionally, a warning alert device is provided to alert the user that the sensed external heat energy value has been exceeded. Block 92 checks to see if the warning alert has been enabled. If it has then the sensed external heat energy value is checked in block 94 to see if the maximum limit has been exceeded. If it has been exceeded, the warning is set to a first state to enable the warning to alert the user in block 96. If the maximum limit has not been exceeded, the warning is set to a second state to disable the warning in block 98.

Although the invention has been described in language specific to structural or methodological steps or both, it is to be understood that the invention defined in the appended claims is not necessarily limited to the specific features or steps described. Rather, the specific features and steps are disclosed as preferred forms of implementing the claimed invention.

What is claimed is:

1. An electronic device, comprising:
   a case;
   at least one heat producing component disposed within said case and capable of transmitting heat energy outside of said case and affecting an external surface;
   a thermal sensor capable of sensing re-radiated heat energy from the affected external surface; and
   control logic connected to said thermal sensor and to said at least one heat producing component wherein said control logic is capable of regulating the heat energy of said at least one heat producing component in response to sensed re-radiated heat energy from said thermal sensor.

2. The electronic device of claim 1, further comprising:
   a heat dissipation structure thermally coupled to said at least one heat producing component and thermally isolated from said thermal sensor.

3. The electronic device of claim 2 wherein said thermal sensor is surrounded by said heat dissipation structure.

4. The electronic device of claim 1 wherein said control logic is capable of detecting the rate of change of heat energy radiated from the affected external surface.

5. The electronic device of claim 1 wherein the control logic is configurable.

6. The electronic device of claim 1 wherein said thermal sensor is further capable of being calibrated by detecting the sensed heat from a known surface temperature.

7. The electronic device of claim 6, further comprising an additional thermal sensor thermally isolated from said heat dissipation structure and said additional thermal sensor connected to said control logic wherein said additional thermal sensor detects the sensed heat from said known surface temperature.

8. The electronic device of claim 6, further comprising a movable lens wherein said movable lens has a first position and a second position and wherein said movable lens in said first position is capable of directing sensed heat onto said thermal sensor from said known surface temperature and wherein said movable lens in said second position is capable of focusing heat energy onto said thermal sensor from the external surface outside of said case.

9. The electronic device of claim 1, further comprising a warning device connected to said control logic wherein said warning device is capable of being set to a first state when said case exceeds a predetermined temperature limit and wherein said warning device is capable of being set to a second state when said case is below said predetermined temperature limit.

10. The electronic device of claim 1, further comprising a warning device connected to said control logic wherein said warning device is capable of being set to a first state when sensed heat energy from said thermal sensor changes more than a predetermined rate and wherein said warning device is capable of being set to a second state when sensed heat energy from said thermal sensor changes at less than said predetermined rate.

11. A method for controlling the temperature of at least one heat producing component in an electronic device having a case, the method comprising the steps of:
   detecting re-radiated heat energy from said at least one heat producing component from an external surface outside of the case; and
   regulating the heat produced by said at least one heat producing component in response to said detected re-radiated heat energy.

12. The method of claim 11, wherein the step of regulating the heat is configurable.

13. The method of claim 11 wherein the step of detecting re-radiated heat energy further comprises the steps of:
   thermal coupling the heat energy from said at least one heat producing component to a heat dissipation structure; and
   detecting heat energy reflected from the surface external to the electronic device using a thermal sensor that is thermally isolated from the heat dissipation structure.

14. The method of claim 11, wherein the step of detecting re-radiated heat energy is performed using a thermal sensor further comprises the steps of:
   detecting sensed heat from a known surface temperature; and
   calibrating the thermal sensor using the detected sensed heat result.

15. The method of claim 14, wherein the step of detecting sensed heat from the known surface temperature is performed using an additional thermal sensor.

16. The method of claim 15, wherein the additional thermal sensor is located in a docking station.

17. The method of claim 14, wherein the step of detecting sensed heat from the known surface temperature further comprises the steps of:
   setting a movable lens having a first and second position to the first position; and
   directing sensed heat from the known surface temperature on the thermal sensor.

18. The method of claim 17, wherein the step of detecting heat energy from said at least one heat producing component from outside the case further comprises the steps of:
   setting the movable lens to the second position; and
   directing heat energy from outside the case on the thermal sensor.

19. The method of claim 18, wherein the step of setting the movable lens to the second position is capable of occurring when the electronic device is inserted into a docking station.

20. The method of claim 11, further comprising the steps of:
   warning when the detected heat energy exceeds a predetermined level; and
   disabling warning when the detected heat energy does not exceed a predetermined level.

21. The method of claim 11, further comprising the steps of:
   warning when the detected heat energy is changing faster than a predetermined rate; and
   disabling warning when the detected heat energy is not changing faster than a predetermined rate.

22. A computing system, comprising:
   an electronic device having a case enclosing the at least one heat producing component, a first thermal sensor for detecting re-radiated heat energy from an external surface outside of the case and control logic for regulating the heat produced from the at least one heat producing component wherein the external surface is affected by the heat from the at least one heat producing component; and a docking station capable of coupling to said electronic device, said docking station having a docking tray as the external surface, wherein the first thermal sensor is capable of detecting the temperature of said docking tray.

23. The computing system of claim 22, wherein the docking tray includes a known surface temperature, and wherein the computing system further comprises a second thermal sensor for detecting the heat energy from the known surface temperature, and wherein the control logic is capable of calibrating the first thermal sensor using the heat energy detected from the second thermal sensor.

24. The computing system of claim 22, wherein a second thermal sensor is located in the electronic device for detecting the heat energy from a known surface temperature, and wherein the control logic is capable of calibrating the first thermal sensor using the heat energy detected from the second thermal sensor.

25. The computing system of claim 22, wherein a second thermal sensor is located in the docking station for detecting the heat energy from a known surface temperature, and wherein the control logic is capable of calibrating the first thermal sensor using the heat energy detected from the second thermal sensor.

26. An electronic device, comprising:
a case;
at least one heat producing component disposed within said case and capable of transmitting heat energy outside of said case;
a thermal sensor capable of sensing heat energy outside of said case;
a heat dissipation structure thermally coupled to said at least one heat producing component and thermally isolated from said thermal sensor and wherein said thermal sensor is surrounded by said heat dissipation structure; and
control logic connected to said thermal sensor and to said at least one heat producing component wherein said control logic is capable of regulating the heat energy of said at least one heat producing component in response to sensed heat energy from said thermal sensor.

27. An electronic device, comprising:
a case;
at least one heat producing component disposed within said case and capable of transmitting heat energy outside of said case;
a thermal sensor capable of sensing heat energy outside of said case;
an additional thermal sensor connected to said control logic and thermally isolated from said heat dissipation structure; and
control logic connected to said thermal sensor and to said at least one heat producing component;
wherein said control logic is capable of regulating the heat energy of said at least one heat producing component in response to sensed heat energy from said thermal sensor; and wherein said thermal sensor is further capable of being calibrated by detecting the sensed heat from a known surface temperature with said additional thermal sensor.

28. An electronic device, comprising:
a case;
at least one heat producing component disposed within said case and capable of transmitting heat energy outside of said case;
a thermal sensor capable of sensing heat energy outside of said case;
a movable lens having a first position and a second position; and
control logic connected to said thermal sensor and to said at least one heat producing component; and
wherein said control logic is capable of regulating the heat energy of said at least one heat producing component in response to sensed heat energy from said thermal sensor and wherein said thermal sensor is further capable of being calibrated by detecting the sensed heat from a known surface temperature and wherein said movable lens in said first position is capable of directing sensed heat onto said thermal sensor from said known surface temperature and wherein said movable lens in said second position is capable of focusing heat energy onto said thermal sensor from a surface exterior to said case.

29. A method for controlling the temperature of at least one heat producing component in an electronic device having a case, the method comprising the steps of:
detecting heat energy outside the case from said at least one heat producing component using a thermal sensor by,
detecting sensed heat from a known surface temperature using an additional thermal sensor, and calibrating the thermal sensor using the detected sensed heat result; and
regulating the heat produced by said at least one heat producing component in response to said detected heat energy.

30. The method of claim 29, wherein the additional thermal sensor is located in a docking station.

31. A method for controlling the temperature of at least one heat producing component in an electronic device having a case, the method comprising the steps of:
detecting heat energy outside the case from said at least one heat producing component using a thermal sensor by,
detecting sensed heat from a known surface temperature by
setting a movable lens having a first and second position to the first position, and directing sensed heat from the known surface temperature on the thermal sensor, and
calibrating the thermal sensor using the detected sensed heat result; and
regulating the heat produced by said at least one heat producing component in response to said detected heat energy.

32. The method of claim 31, wherein the step of detecting heat energy from said at least one heat producing component from outside the case further comprises the steps of:
setting the movable lens to the second position; and
directing heat energy from outside the case on the thermal sensor.

33. The method of claim 32, wherein the step of setting the movable lens to the second position is capable of occurring when the electronic device is inserted into a docking station.

34. A computing system, comprising:
an electronic device having a case enclosing at least one heat producing component, a first thermal sensor for detecting heat energy from outside of the case and control logic for regulating the heat produced from the at least one heat producing component; and a docking station capable of coupling to said electronic device, said docking station having a docking tray surface, wherein the first thermal sensor is capable of detecting the temperature of said docking tray surface, wherein the docking tray surface includes a known surface temperature, and wherein the computing system further comprises a second thermal sensor for detecting the heat energy from the known surface temperature, and wherein the control logic is capable of calibrating the first thermal sensor using the heat energy detected from the second thermal sensor.

35. The computing system of claim 34, wherein said second thermal sensor is located in the electronic device.

36. The computing system of claim 34, wherein said second thermal sensor is located in the docking station.

* * * * *